United States Patent [19]

Grady et al.

[11] Patent Number: 5,447,998

[45] Date of Patent: Sep. 5, 1995

[54] CLEAR COAT RESINS BY CONTINUOUS POLYMERIZATION

[75] Inventors: Michael C. Grady, Haddon Township, N.J.; Basil V. Gregorovich, Wilmington, Del.

[73] Assignee: E. I. du Pont de Nemours and Company, Wilmington, Del.

[21] Appl. No.: 224,418

[22] Filed: Apr. 8, 1994

[51] Int. Cl.$^6$ ............................................. C08F 18/02
[52] U.S. Cl. ......................................... 526/65; 526/88; 526/319; 526/329.2
[58] Field of Search ................. 526/88, 65, 319, 329.2

[56] References Cited

U.S. PATENT DOCUMENTS

| | | | |
|---|---|---|---|
| 4,275,177 | 6/1981 | Walkenhorst et al. | 525/53 |
| 4,414,370 | 11/1983 | Hamielec et al. | 526/88 |
| 4,529,787 | 7/1985 | Schmidt et al. | 526/317 |
| 4,543,383 | 9/1985 | Heil et al. | 524/458 |
| 4,546,160 | 10/1985 | Brand et al. | 526/320 |
| 4,937,298 | 6/1990 | Miura et al. | 526/65 |

*Primary Examiner*—Joseph L. Schofer
*Assistant Examiner*—Tom Weber
*Attorney, Agent, or Firm*—James T. Corle

[57] ABSTRACT

A process for preparing acrylic polymers having good crater resistance by continuous polymerization in vessels having agitating means tip speed from 500 to 1200 rpm. Placement of the feed valve for charging the monomer and/or the initiator is located beneath the surface of the agitating mass.

10 Claims, 1 Drawing Sheet

CLEAR COAT RESINS BY CONTINUOUS POLYMERIZATION

BACKGROUND OF THE INVENTION

Styrene and acrylic acid copolymers of low molecular weight have found wide acceptance in industry. Such copolymers, sometimes denominated as "solution polymers" have been employed in inks, paper coatings and paints. Typically vinylic monomers have been produced using mass polymerization techniques in the presence of a solvent. Often, the reaction is expedited with the assistance of catalytic initiators and chain transfer agents, to control the molecular weight of the product copolymers. Examples of such copolymerization techniques are disclosed in U.S. Pat. Nos. 2,556,488; 3,673,168; 3,753,958; 3,879,357 and 3,968,059.

With the cost of petroleum feedstock rising in recent years, the price of vinyl monomers has risen as well. The solvents normally employed in solution polymerization are expensive and safety problems have arisen with use of volatile organic solvents. Since solution polymerization is typically carried out in large batches, if the process malfunctions, then an unacceptably large amount of product must be wasted.

Accordingly, a continuous bulk polymerization process, capable of selectively producing low molecular weight vinylic copolymers having a low dispersion index, employing thermal initiators, without the need of a solvent, catalyst or weight retarding agent. U.S. Pat. No. 4,414,370 teaches a bulk polymerization process for preparing low molecular weight vinylic polymers having a dispersion index less than 2, a number average molecular weight from about 1000 to 6000, and a solids content of from 80 to 95 percent by weight of a polymer.

A substantial amount of research effort in the automotive industry has been directed to the development of clear coat automotive finishes. Due to stringent air pollution regulations, high solids coating compositions have been formulated which contain substantially less solvent and more film forming binder. However, finishes resulting from these compositions have a significant number of craters which give the finish an unacceptable appearance for use on automobiles and trucks. Cratering is the formation of circular depressions on the coating surface. These depressions can vary between shallow dimples and deep holes that go through the coating to the next substrate. In severe cases, the coating applicator can find hundreds of such defects on the painted object requiring repair or rejection of that object.

Heretofore, the problem of cratering defects have been attacked by use of additives to high solids coating compositions. Such additives are shown, for example, by U.S. Pat. Nos. 4,371,657; 4,396,680; and 4,402,983. Such additives, however, may also result in a worsening of appearance while decreasing cratering.

The novel process of the present invention produces polymers solutions which have greater crater resistance, reduced solution viscosity and improved durability than polymers produced by conventional techniques without the use of additives.

SUMMARY OF THE INVENTION

A process for preparing acrylic polymers that will show good crater resistance as a clearcoat in automotive applications is disclosed. High agitation tip speeds, from 500 to 1200 rpm, are maintained in the polymerization vessels with a blade diameter to tank diameter range of 0.15–0.95. In addition, placement of the feed valve for charging the monomer into the polymerization vessel is below the surface of the agitating mass. The initiator may also be introduced into the polymerization vessel below the surface of the monomer mixture. The temperature of polymerization is maintained in the range of 80° to 180° C.

DETAILED DESCRIPTION OF THE INVENTION

Figure 1:
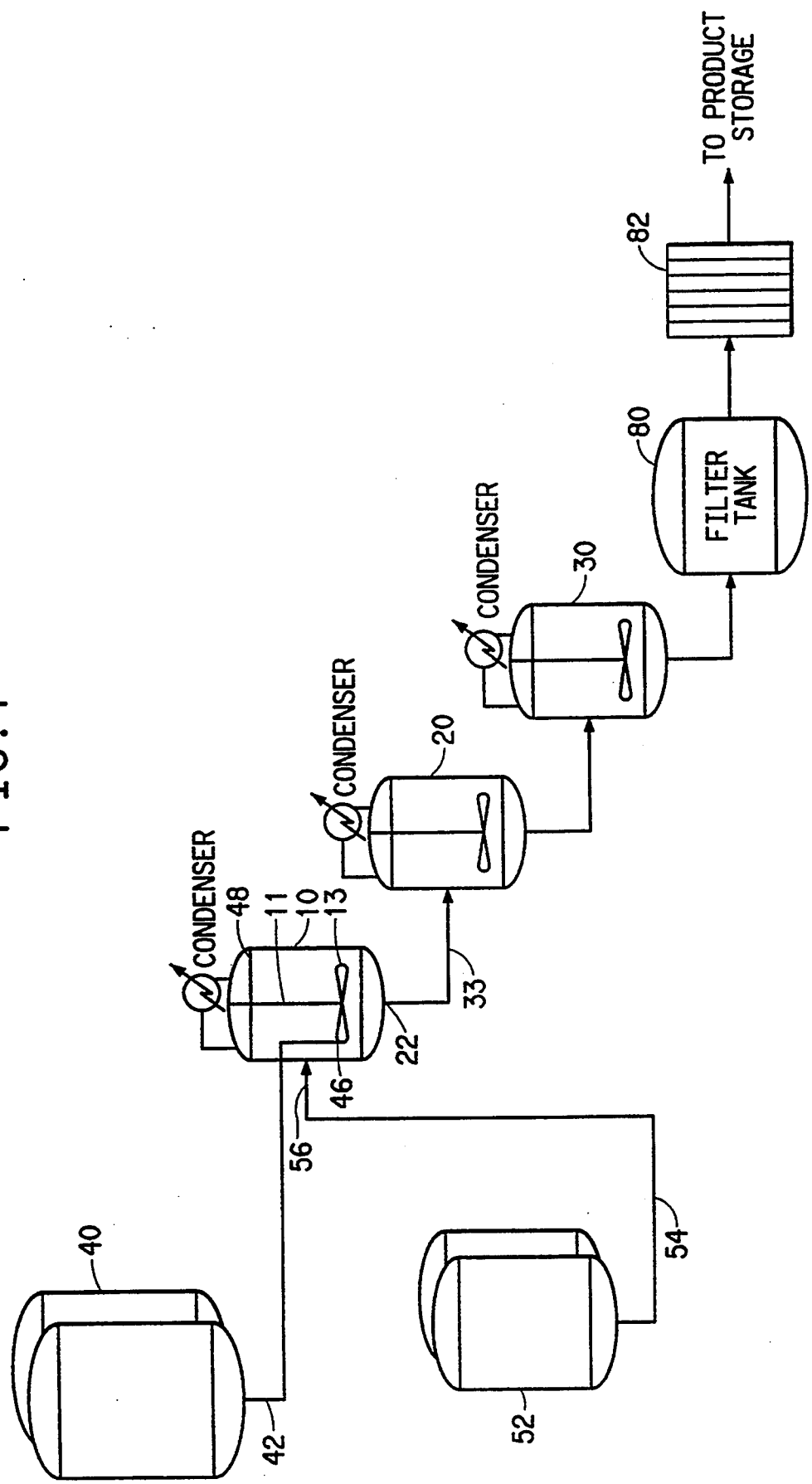
FIG. 1 is a process flow diagram for the production of acrylic polymer.

The process of the present invention allows polymerization of acrylic resins for applications as a clearcoat finish which have increased durability, improved crater resistance and reduced solution viscosity without the use of additives.

The process of the present invention involves the use of a variable fillage type stirred reactor for the polymerization of acrylic monomers to copolymers. The reaction zone can comprise a continuous stirred tank reactor of any type adapted for variable fillage operation of from as low as 10 percent to 100 percent of the usable volume thereof. This continuous stirred tank reactor may be either horizontal or vertical and should have provision for closed control of the temperature therein by any desired means, including control by cooling jacket, internal cooling coils or by withdrawal of vaporized monomer followed by condensation thereof and return of the condensed monomer to the reaction zone. This reaction zone can, if desired, be constituted by a plurality of continuous stirred tank reactors operated in series. Likewise it will be apparent that such reaction zone can comprise more than one continuous stirred tank reactor operated in parallel, if it is desired to employ several relatively small reactors to supply the capacity of the final reaction zone rather than a single large reactor for that purpose.

A preferred form of continuous stirred reactor which has been found quite suitable for carrying out the process is a tank reactor provided with heating coils sufficient to remove any heat of polymerization not taken up by raising the temperature of the continuously charged monomer composition so as to maintain a preselected temperature for polymerization therein. Preferably such a continuously stirred tank reactor is provided with at least one and usually more vaned agitators driven by an external power source such as a motor. The upper blade in a multiple agitation configuration is usually smaller in diameter than the lower blade. At least one such agitator is positioned to provide agitation of liquid contained in the reactor while operating at minimum fillage, i.e., as low as 10 percent of the volume thereof. The blades of each agitation can be pitched or flat, with the pitch usually not greater than 45 degrees. Such a continuous stirred tank reactor can, if desired, be provided with additional features for improved efficiency of operation and safety, such as an additional series of internal cooling coils adapted to effectively prevent any "run-away" polymerization if the normal holding period has to be extended for some reason and an outer jacket for additional cooling or heating of the contents of the reactor.

In operation of the present continuous polymerization process, flexibility and range of choice can be realized in polymer types produced, as well as the production rate thereof, by proper choice of polymerization reaction conditions.

Polymerization conditions are continuously maintained in the reactor to produce a polymer of selected weight percent solids of polymer in such liquid mixture. The reaction zone can be operated so as to produce a liquid mixture with a polymer concentration or percent solids from as low as 10 percent to as high as 90 percent by weight and such polymer can possess a number average molecular weight ranging from 500 to 50,000. The level of fillage in the reactor can vary from as low as 10 percent to as high as 100 percent usable volume, and may be controlled by any desired means, for example, a level controller and associated valve, gravity flow, or a pump in the transfer line from the reactor.

Any desired means of controlling the temperature within the reactor may be employed. It is preferred that the temperature be controlled by circulation of a cooling fluid, such as oil, through internal cooling coils in those reactors so equipped. The entry of relatively cool monomer composition serves to remove the greater proportion of the heat of polymerization released and the internal cooling coils serve to remove the remainder so as to control the temperature of the liquid mixture therein to a preselected value and thus produce a polymer of the desired degree of conversion and average molecular weight and distribution.

In order to obtain a polymer of the invention with the desired molecular weight and dispersion index in order to provide a high quality solution-type polymer, the reaction temperature is maintained from about 80° C. to about 180° C.

At reaction temperatures below about 80° C. the molecular weight of the product increases. The products formed at these low temperatures are quite viscous and difficult to handle. At high temperatures, undue quantities of dimers and trimers are formed.

In general, the reaction time or residence time in the reaction zone is controlled by the rate of flow of constituents through the reaction system. The residence time is inversely proportional to flow rate. It has been found that at a given temperature, the molecular weight of the polymer product varies with the residence time.

In accordance with these factors it is therefore preferred to utilize reaction residence times of at least about 15 minutes to provide satisfactory reaction completion. While the residence time in the reaction zone may be as long as 120 minutes, discoloring reactions and other side reactions will normally dictate that shorter residence times be employed. For most cases a residence time of from about 30 to 90 minutes, and, preferably, from 20 to 60 minutes is satisfactory. In general, even longer residence times increase the yield of product, but the rate of increase of product is generally very slow after about 20 to 30 minutes of reaction.

The flow rate of reactants for the preferred monomer mix is between about 0.1 to 1.5 pound per hour per gallon of reactor capacity. The flow rate elected for a particular monomer system will depend upon the reaction temperature, constituents, desired molecular weight, desired dispersion index and the particular equipment employed.

The preferred embodiment of the invention is run at pressures from 0 to 45 psig. The reaction pressure in an enclosed system is a function of residual vapor pressure of unreacted monomer and other volatiles present either in the feed, such as water, or in the reaction mix (produced in side reactions). Although at steady state the process is carried out under a positive pressure, the reaction pressure has no significant effect on the yield and the upper limit is a function of equipment capability, while the lower limit is a function of feed rate and monomer composition. At higher temperatures, the higher gas pressures which result may require special equipment and procedures for safe handling.

The polymers produced by the process of the invention suitable for high solids applications have a weight average molecular weight, $M_w$, from about 2,000 to about 50,000, preferably from about 5,000 to 35,000. The polydispersity ratio, weight average molecular weight -$M_w$/number average molecular weight-$M_n$, for the polymers inventive process is less than about 2.5 and more preferably less than about 2.0. The distribution index should be less than about 4.0. Molecular weights are determined by gel permeation chromatography.

The term "acrylic monomer" as employed herein includes acrylic or methacrylic acid, esters of acrylic or methacrylic acid and derivatives and mixtures thereof. Examples of suitable acrylic monomers include the following methacrylic esters: methyl methacrylate, ethyl methacrylate, n-propyl methacrylate, n-butyl methacrylate, isopropyl methacrylate, isobutyl methacrylate, n-amyl methacrylate, n-hexyl methacrylate, isoamy methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, benzyl methacrylate, 2-n-butoxyethyl methacrylate, 2-chloroethyl methacrylate, sec-butylmethacrylate, tert-butyl methacrylate, 2-ethylbutyl methacrylate, cinnamyl methacrylate, cyclohexyl methacrylate, cyclopentyl methacrylate, 2-ethoxyethyl methacrylate, furfuryl methacrylate, hexafluoroisopropyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate.

Typical acrylates esters employed include: methyl acrylate, ethyl acrylate, n-propyl acrylate, isopropyl acrylate, n-butyl acrylate and n-decyl acrylate.

The acrylic monomer can also include acrylates or methacrylates containing functional groups, such as hydroxy, carboxyl amino, isocyanate, and the like. The functional polymers are usually prepared by polymerization employing a functional monomer or by postreaction of a polymer of the invention to introduce the desired functionality.

Acrylic acid derivatives employed as the acrylic monomers include: acrylic acid, acrylonitrile, methyl alpha-chloroacrylate, methyl 2-cyanoacrylate, N-ethylacrylamide, and N,N-diethylacrylamide.

Esters of methacrylic acid or acrylic acid containing a suitable functional group may be used as the monomer. Typical preferred functional acrylates and methacrylates include acrylic acid, methacrylic acid, hydroxy alkyl acrylates, and hydroxyl alkyl methacrylates.

Examples of preferred hydroxy functional monomers include 2-hydroxyethyl acrylate, 3-chloro-2-hydroxypropyl acrylate, 2-hydroxy-butyl acrylate, 6-hydroxyhexyl acrylate, 2-hydroxymethyl methacrylate, 2- hydroxypropyl methacrylate, 6-hydroxyhexyl methacrylate, 5,6-dihydroxyyhexyl methacrylate and the like.

Hydroxyl or other functionality may also be introduced into the polymers of the invention by post-reacting a polymer with standard techniques such as esterification or transesterification techniques.

The present invention is also applied to the preparation of copolymers from mixtures of two or more acrylic monomers such as comonomers, termonomers and tetramonomers. It is also contemplated that mixtures of at least one acrylic monomer and at least one non-acrylic nonstyrenic monomer may be polymerized in accordance with the present invention.

Suitable monomers include: vinyl acetate, vinyl pyridine, vinyl pyrollidone, methyl crotonate, crotonic acid and maleic anhydride.

Preferred monomer charges include the comonomer charges, such as 2-ethylhexyl acrylate and acrylic acid, the termonomers, such as 2-ethylhexyl acrylate, methyl methacrylate and vinyl acetate and the tetramonomers; such as vinyl acetate, butyl acrylate, methyl methacrylate and 2-hydroxy ethyl methacrylate.

The initiators suitable for carrying out the process according to the present invention are compounds which decompose thermally into radicals in a first order reaction. Suitable initiators preferably have half-life periods (pot-lives) in the radical decomposition process of about 1 hour at 90° C. and more preferably 10 hours at 100° C. Others with about 10 hour half-lives at temperatures significantly lower than 100° C. may also be used. Suitable initiators are, for example, aliphatic azo compounds such as 1-t-amylazo-1-cyanocyclohexane, azo-bis-isobutyronitrile and 1-t-butylazocyanocyclohexane and peroxides and hydroperoxides, such as t-butylperoctoate, t-butyl perbenzoate, dicymyl peroxide, di-t-butyl peroxide, t-butyl hydroperoxide and cumene hydroperoxide and the like. The particular initiator is not critical so long as the initiator will generate free radicals.

It has been found that when the molar ratio of initiator to monomers charge is at least about 0.0005:1, it is possible to reduce the reaction temperature to improve purity, color, conversion and ease processing conditions, while maintaining or improving low molecular weight and molecular weight distribution. In addition, the yields of polymer product recovered without recycle, can be on the order of at least 95% of the theoretical.

If desired, from about 20 to 60 percent of reaction solvent is employed based on the weight of monomers. The selection of a particular solvent and its level of addition are made based on the monomers selected, the desired applications for the polymer produced and also to assist in controlling reaction parameters. In general, it is preferred to use as little solvent as possible to reduce separation and recovery requirements and minimize the formation of contaminants. It is thought that the chain transfer effects of solvents may contribute to the production of excess dimers, trimer and to the production of by-product chomophores.

In general, the use of a solvent permits a lower reaction temperature to be employed, allows lower flow rates, reduces the solution viscosity of the molten polymer product, acts as a heat sink to prevent runaway reactions and reduce cooling requirements, assists in plasticizing the polymer product, and may reduce the acid number if the solvent esteries with the resin and may reduce molecular weight of the resulting product.

Most conventional polymerization or reaction solvents may be utilized in the present process to prepare the low molecular weight polymers of the instant invention.

The aliphatic alcohols, such as acetone, ethyl alcohol, and hexanol can be used. Aromatic solvents can also be employed, for example, toluene, cumene, and ethylbenzene. Oxygenated solvents are also suitable.

For best results from about 40 to 80 percent by weight of monomers is employed. While greater or lesser amounts can sometimes be employed, there is an insufficient reduction in viscosity when less than about 20 percent of solvent is employed. When amounts greater than about 60 percent by weight of solvent are utilized, then the process tends to become solvent dependent as a typical solution polymerization process.

A preferred embodiment of the process of the present invention is illustrated in FIG. 1, which is a flow sheet showing the polymerization process. The process is practiced in continuously stirred tank reactors 10, 20 and 30. Each reactor comprises a steel vessel with a centrally disposed propeller shaft 11 extending from a superimposed propeller drive and motor assembly, not shown. Each propeller shaft such as 11 supports one or more propellers formed of a plurality of radial blades 13 which can be entirely radial, i.e., having no axial pitch, or can have an axial pitch, e.g., from about 5 to about 45 degrees. The ratio of the blade diameter to the tank diameter ranges from 0.15 to 0.95. Lower blade diameter to tank diameter ratios are less costly in terms of capital expenditure and operating costs. The propellers intimately admix the polymerization mixture to form a homogeneous mass therein. High agitation rates are preferred, with tip speeds of at least 500 feet per minute used in the process.

Each tank reactor has a bottom discharge nozzle 22 that discharges into a transfer line to the next reactor. The crude polymerizate is transferred from the first tank reactor 10 to the second tank reactor 20 through a bottom discharge nozzle 22 into a transfer line 33. The exothermic heat of polymerization is removed from the reactors by reflux cooling. To this end, the tank reactors 10, 20 and 30 are totally enclosed and are maintained at a predetermined pressure.

The monomer feed and the initiator feed are introduced separately into the tank reactor 10. The monomer mixture is charged from a monomer feed tank 40 through transfer line 42 to inlet 44 on the tank reactor 10 with the outlet 46 of the transfer line 42 positioned below the surface of the agitating mass 48. Preferably the monomer is added to the agitating mass near or about the radial blade 13. As the ratio of blade diameter to tank diameter approaches the lower limit, e.g., 0.15, the effect of subsurface addition of the monomer becomes more significant. The initiator is charged from an initiator feed tank 52 through transfer line 54 to inlet 56 on tank reactor 10. Inlet 56 is positioned below the surface of the agitating mass 48.

Most of the polymerization is performed in the first tank reactor 10. Typically, 50 to 95 percent, preferably 80 to 95 percent, of the conversion of the monomer achieved in the process is accomplished in the first tank reactor. Generally, the temperature within this reactor is from about 80° to 180° C. The particular temperature chosen is selected for the molecular weight and other properties desired in the final polymer product. The remaining tank reactors 20 and 30 serve to complete the polymerization process. Monomer conversion in the tank reactor 30 is typically greater than 99 percent. The finished polymer is withdrawn from reactor tank 30 and is passed to filter tank 80 and through filters 82 to remove particulate contaminants and then stored.

The following examples are set forth to illustrate more clearly the principles and practices of this invention to one skilled in the art. As such, they are not intended to limit the invention, but are illustrative of certain preferred embodiments.

EXAMPLE I

Copolymer was produced under non-continuous conditions to be used as a control. The following acrylic polymer was prepared by charging into a polymerization vessel equipped with a stirrer, thermometer and reflux condenser a mixture of 38 parts hydroxy propyl acrylate, 30 parts n-butyl methacrylate, 15 parts styrene and 17 parts n-butyl acrylate.

The monomer mix was added from a feed tank at a constant delivery rate of 0.028 pounds per minute at a level above the surface of the polymerization vessel. The contents of the vessel were continuously stirred at a constant rate of 400 rpm using a dual blade pitched turbine. The mixture was brought to a polymerization temperature of 152° C.

The initiator used was t-butyl peroxyacetate (TBPA). The initiator was charged into the polymerization vessel above the surface of the agitating mass at a constant rate of 0.012 pounds per minute. The mixture was agitated for 60 minutes before cooling.

The resulting acrylic polymer solution had a weight percent solids of 70, molecular average weight of 7500, polydispersity ratio of 2.5, and Gardner-Holdt viscosity of Y-Z1. Solutions were tested for the tendency to crater and dimple under ASTM-340-W. The average crater resistance was 75.

EXAMPLE II

The following mixture was charged into the polymerization vessel: 38 parts hydroxypropyl acrylate, 30 parts n-butyl methacrylate, 15 parts styrene and 17 parts n-butyl acrylate at a constant flow rate of 0.025 pounds per minute. The monomer was fed into the vessel through a feed tube located below the surface of the polymerization vessel. The contents of the vessel were agitated at a constant rate of 1750 rpm and were heated to a polymerization temperature of 163° C. The initiator used was TBPA, and was fed into the polymerization vessel at a constant rate of 0.0008 pounds per minute through a separate feed tube located above the surface of the polymerization vessel. The reaction was run continuously for ten hours with a residence time of 60 minutes with a continuous withdrawal of polymer to maintain a constant level in the polymerization vessel.

The resulting acrylic polymer solution had a weight percent solids of 70, molecular average weight at 7500, polydispersity ratio of 2.5, and Gardner-Holdt viscosity of Y-Z1. Solutions were tested for the tendency to crater and dimple under ASTM-340-W. The average crater resistance was 2.

EXAMPLE III

The monomer feed composition of Example II was used and was charged at a constant rate of 0.028 pounds per minute. The monomer was fed into the vessel through a feed tube located below the surface of the polymerization vessel. The contents of the vessel were agitated at a constant rate of 1750 rpm and were heated to a polymerization temperature of 163° C. The initiator used was VAZO 52, and was fed into the polymerization vessel at a constant rate of 0.012 pounds per minute through a separate feed tube located below the surface of the polymerization vessel. The reaction was continuously run for ten hours with a continuous withdrawal of polymer to maintain a constant level in the polymerization vessel.

The resulting acrylic polymer solution had a weight percent solids of 70, molecular average weight at 7500, polydispersity ratio of 2.5, and Gardner-Holdt viscosity of Y-Z1. Solutions were tested for the tendency to crater and dimple under ASTM-340-W. The average crater resistance was 2.

EXAMPLE IV

A mixture containing 40 parts methyl methacrylate, 33 parts n-butyl methacrylate, 15 parts vinyl oxazoline ester of linseed oil fatty acid, 5 parts 2-diethylaminomethyl methacrylate, and 7 parts hydroxy ethyl acrylate was charged into a polymerization vessel at 0.443 pounds per minute. The monomer was fed into the vessel through a feed tube located below the surface of the polymerization vessel. The contents of the vessel were agitated at a constant rate of 1750 rpm and were heated to a polymerization temperature of 80° C. The initiator used was VAZO 64 and added at a constant rate of 0.152 pounds per minute. The initiator was added below the surface of the polymerization vessel. The reaction was continuously run for ninety-six hours with a continuous withdrawal of polymer to maintain a constant level in the polymerization vessel.

The polymer had a weight percent solids of 58, and a Gardner-Holdt viscosity of Y-Z1. The molecular weight is about 32,000 with polydispersity at 4.0. The average crater resistance was 1.

EXAMPLE V

The mixture contained 60 parts n-butyl methacrylate and 40 parts hydroxy propyl acrylate. The monomer was fed into the vessel through a feed tube located below the surface of the polymerization vessel at a constant rate of 1.21 pounds per minute. The contents of the vessel were agitated at a constant rate of 635 rpm and were heated to a polymerization temperature of 160° C. The initiator used was TBPA, and was fed into the polymerization vessel at a constant rate of 0.035 pounds per minute through a separate feed tube located below the surface of the polymerization vessel. The reaction was run continuously for ten hours with a residence time of 30 minutes with a continuous withdrawal of polymer to maintain a constant level in the polymerization vessel.

The weight percent solids was 69, and the Gardner-Holdt viscosity was Y-Z1. The average molecular weight was 7500 with polydispersity at 2.2. The average crater resistance was 1.

What is claimed is:

1. A polymerization process for preparing an acrylic polymer with good crater resistance comprising the steps of:
    (a) charging into a variable filling reactor vessel, a reaction mixture comprising:
        (i) at least one acrylic monomer, wherein said acrylic monomer is added to said variable fillage reactor vessel at a point below the surface of said reaction mixture;

(ii) a polymerization initiator in amounts to provide a molar ratio of said initiator to said acrylic monomer from about 0.01 to 0.09;

(iii) a solvent from about 0 to 60 percent based on the weight of said acrylic monomer;

(b) continuously stirring said variable fillage reactor vessel;

(c) maintaining a flow rate through said variable fillage reactor vessel sufficient to:

(i) provide a residence time of said acrylic monomer in said variable fillage reactor vessel of at least 15 minutes;

(ii) maintain a predetermined level of said reaction mixture in said variable fillage reactor zone;

(iii) maintain said reaction mixture at an elevated temperature sufficient to provide accelerated conversion to a readily processable uniform concentrated polymer product; and (d) recovering said acrylic polymer.

2. The process of claim 1 wherein the temperature is within the range of 80° to 180° C.

3. The process of claim 1 wherein the residence time is about 15 to 120 minutes.

4. The process of claim 1 in which a solvent capable of forming a reaction product with the polymer is employed in the mixture of acrylic monomers.

5. The process of claim 1 wherein said initiator is added to said variable fillage reactor vessel at a point below the surface of said reaction mixture.

6. The process of claim 1 wherein an agitating means having a tip speed of at least 500 rpm is employed to continuously stir said variable fillage reactor vessel.

7. The process of claim 6 wherein the ratio of the diameter of said agitating means to the diameter of said variable fillage reactor vessel is from 0.15 to 0.95.

8. The process of claim 1 wherein said reaction mixture is transferred into a second variable fillage reactor vessel.

9. The process of claim 8 wherein an agitating means having a tip speed of at least 500 rpm is employed to continuously stir said second variable fillage reactor vessel.

10. The process of claim 9 wherein the ratio of the diameter of said agitating means to the diameter of said second variable fillage reactor vessel is from 0.15 to 0.95.

* * * * *